(12) United States Patent  (10) Patent No.: US 7,597,490 B2
Horiguchi  (45) Date of Patent: Oct. 6, 2009

(54) CAMERA AND A PORTABLE APPARATUS HAVING A FLAT BODY

(75) Inventor: Shigeru Horiguchi, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 835 days.

(21) Appl. No.: 10/978,351

(22) Filed: Nov. 2, 2004

(65) Prior Publication Data

US 2005/0078210 A1   Apr. 14, 2005

Related U.S. Application Data

(62) Division of application No. 09/840,107, filed on Apr. 24, 2001, now Pat. No. 6,837,630.

(30) Foreign Application Priority Data

Apr. 24, 2000   (JP) ............................... 2000-163736

(51) Int. Cl.
    G03B 17/38   (2006.01)
(52) U.S. Cl. ........................ 396/502; 396/535; 396/540
(58) Field of Classification Search .................... 396/56, 396/59, 64, 333, 429, 502, 535, 540, 543, 396/85, 119, 374; 348/371, 375, 333.06
    See application file for complete search history.

(56) References Cited

U.S. PATENT DOCUMENTS

| 3,098,417 | A | 7/1963 | Lind et al. .................... 396/144 |
|---|---|---|---|
| 3,836,985 | A | 9/1974 | Lange ......................... 396/323 |
| 4,075,642 | A | 2/1978 | Niggeloh ..................... 396/424 |
| 4,312,584 | A | 1/1982 | Lee ............................... 396/502 |
| 4,441,801 | A | 4/1984 | Mashimo et al. ............. 396/406 |
| 4,685,787 | A | 8/1987 | Kinnard ......................... 396/32 |
| 5,740,478 | A | 4/1998 | Kobayashi ................... 396/121 |
| 6,272,290 | B1 * | 8/2001 | Mogamiya .................... 396/59 |
| 6,314,248 | B1 | 11/2001 | Ohmura et al. .............. 396/429 |
| 6,339,508 | B1 | 1/2002 | Nozawa et al. .............. 359/686 |
| 6,374,052 | B1 | 4/2002 | Satoh et al. .................. 396/213 |
| 6,456,799 | B2 | 9/2002 | Enderby ....................... 396/323 |
| 6,459,857 | B2 * | 10/2002 | Kawamura et al. .......... 396/374 |
| 6,573,939 | B1 * | 6/2003 | Yokoyama ................... 348/375 |
| 6,837,630 | B2 * | 1/2005 | Horiguchi .................... 396/502 |
| 2001/0014214 | A1 * | 8/2001 | Hayashi et al. ................ 396/85 |
| 2002/0015593 | A1 * | 2/2002 | Kai et al. ...................... 396/419 |
| 2005/0062876 | A1 * | 3/2005 | Okutani et al. .............. 348/371 |

FOREIGN PATENT DOCUMENTS

JP          51-39034         4/1976

(Continued)

Primary Examiner—Melissa J Koval
(74) Attorney, Agent, or Firm—Oblon, Spivak, McClelland, Maier & Neustadt, L.L.P.

(57) ABSTRACT

A camera including a camera body having a substantially flat shape, a photographing optical system configured to perform a photographing operation and accommodated in the camera body, the photographing optical system having a photographing optical axis in a direction perpendicular to a thickness direction of the camera body and a photographing object side plane, the photographing object side plane facing an object to be photographed when photographing, and a release button configured to activate the photographing operation of the photographing optical system provided on a side surface of the camera body corresponding with the photographing object side plane of the photographing optical system.

47 Claims, 10 Drawing Sheets

FOREIGN PATENT DOCUMENTS

| | | |
|---|---|---|
| JP | 3-20576 | 2/1991 |
| JP | 4-141639 | 5/1992 |
| JP | 7-175127 | 7/1995 |
| JP | 9-65191 | 3/1997 |
| JP | 10-31251 | 2/1998 |
| JP | 10-341360 | 12/1998 |
| JP | 2598790 | 6/1999 |
| JP | 11-317897 | 11/1999 |
| JP | 2000-047305 | 2/2000 |

\* cited by examiner

CAMERA AND A PORTABLE APPARATUS HAVING A FLAT BODY

CROSS-REFERENCE TO RELATED APPLICATIONS

The present application filed Apr. 24, 1001, and claims priority to Japanese Patent Application No. 2000-163736 filed in the Japanese Patent Office on Apr. 24, 2000. The contents of those applications are hereby incorporated by reference in their entirety.

The present application also claims priority to U.S. application Ser. No. 09/840,107, filed on Apr. 24, 2001, now U.S. Pat. No. 6,837,630.

BACKGROUND OF THE INVENTION

1. Field of the Invention

The present invention relates to a camera and a portable apparatus having a photographing function.

2. Discussion of the Background

In recent years, electronic cameras called digital cameras have been rapidly spreading. The digital cameras photograph an object with a solid-state photographing element such as a CCD (charge-coupled device) photographing element, obtain image data of a still image of the object, and digitally record the data in a small memory medium using, for example, a flash memory or a video floppy disk. The inputting plane of the solid-state photographing element of digital cameras is small relative to an inputting plane of silver-salt film cameras, and therefore it is relatively easy to reduce the size of the digital cameras. The silver-salt film cameras have also progressed to be reduced in size by improvement of the optical systems.

FIG. 14 illustrates a background silver-salt camera. A camera body 101 is shaped in a rectangular parallelepiped shape and constructed such that a photographing optical system 103 protrudes from a side surface of the camera body 101 in the thickness direction. The camera body 101 formed in such a shape is generally held for photographing such that the photographing optical axis of the photographing optical system 103 and the longitudinal direction of the camera boy 101, that is a direction perpendicular to the optical axis, are both horizontal. In the camera body 101 as described above, a release button 102 is arranged at an upper surface of the camera body 101 near a corner thereof when the camera body 101 is held in a standard photographing posture as illustrated in FIG. 14.

The publication of Japanese Utility Model No. 2598790 describes a construction of a camera grip for a camera, in which separately from a first release button, a second release button is provided on the grip. In the grip, a posture sensor is provided for detecting a slanted angle of the camera. The first and second release buttons are selectively switched to be active by the posture sensor.

Recently, as cameras are continued to be made smaller and lighter, for example, by employment of the electronics technology, cameras having a flat camera body as illustrated in FIG. 15 have increased. A camera of FIG. 15 has a camera body 111 having a flat shape, and a photographing optical axis A of a photographing optical system of the camera is arranged in parallel to a surface direction of the flat surface, i.e., in the thickness direction of the flat camera body 111. Because such a flat camera is compressed in size, the camera occupies only a small space when being carried and is conveniently put in a bag or hung from the body, for example, the hand, the arm, the shoulder or the neck. Therefore, as the cameras are further reduced in size and become lighter in weight, camera bodies having a flat shape and a photographing optical axis of a photographing optical system arranged in parallel to a surface direction of the flat surface tend to increase. To photograph with such a flat-shaped camera, the flat camera body 111 is held substantially in a horizontal position. A release button 112 to open and close a shutter for the photographing operation is generally arranged on an upper surface of the camera body 111 as the camera body 111 is horizontally held.

Because the release button 112 is arranged on an upper surface of the flat camera body 111 as described above, it is hard to bring the hand in close contact with the camera body 111 to firmly hold the camera body 111. Further, because the operation direction of the release button 112 is perpendicular to the photographing optical axis, the operation of the release button 112 is likely to cause the camera to be shaken, resulting in a blurred photograph.

SUMMARY OF THE INVENTION

According to one aspect of the present invention, a camera includes a camera body having a substantially flat shape, a photographing optical system configured to perform a photographing operation and accommodated in the camera body, the photographing optical system having a photographing optical axis in a direction perpendicular to a thickness direction of the camera body and a photographing object side plane, the photographing object side plane facing an object to be photographed when photographing, and a release button configured to activate the photographing operation of the photographing optical system provided on a side surface of the camera body corresponding with the photographing object side plane of the photographing optical system.

According to another aspect of the present invention, a camera includes a camera body having a substantially flat shape, a photographing optical system configured to perform a photographing operation and accommodated in the camera body, the photographing optical system having a photographing optical axis in a direction perpendicular to a thickness direction of the camera body and a photographing object side plane, the photographing object side plane facing an object to be photographed when photographing, a release button configured to activate the photographing operation of the photographing optical system and provided on an upper surface of the camera body, the upper surface facing upward when the photographing optical axis of the photographing optical system is horizontal and the photographing object side plane of the photographing optical system is directed toward the object to be photographed, and a grip protruding from a bottom surface of the camera body, the bottom surface facing downward when the photographing optical axis of the photographing optical system is horizontal and the photographing object side plane of the photographing optical system is directed toward the object.

According to yet another aspect of the present invention, a camera includes a camera body having a substantially flat shape, a photographing optical system configured to perform a photographing operation and accommodated in the camera body, and a plurality of release buttons each configured to activate the photographing operation of the photographing optical system.

According to still another aspect of the present invention, a method of making a camera includes forming the camera body having a substantially flat shape, accommodating in the camera body a photographing optical system configured to perform a photographing operation such that a photographing optical axis thereof is arranged in a direction perpendicular to a thickness direction of the camera body, and arranging a release button configured to activate the photographing operation of the photographing optical system at a side surface of the camera body corresponding with a photographing object side plane of the photographing optical system, the photographing object side plane facing an object to be photographed when photographing.

According to still another aspect of the present invention, a method of making a camera includes forming a camera body having a substantially flat shape, accommodating in the camera body a photographing optical system configured to perform a photographing operation such that a photographing optical axis thereof is arranged in a direction perpendicular to a thickness direction of the camera body, arranging a release button configured to activate the photographing operation of the photographing optical system at an upper surface of the camera body, the upper surface facing upward when the photographing optical axis of the photographing optical system is horizontal and a photographing object side plane of the photographing optical system is directed toward an object to be photographed, and providing a grip so as to protrude from a bottom surface of the camera body, the bottom surface facing downward when the photographing optical axis of the photographing optical system is horizontal and the photographing object side plane of the photographing optical system is directed toward the object.

According to still another aspect of the present invention, a portable apparatus includes an apparatus body having a substantially flat shape, a photographing optical system configured to perform a photographing operation and accommodated in the apparatus body, the photographing optical system having a photographing optical axis in a direction perpendicular to a thickness direction of the apparatus body and a photographing object side plane, the photographing object side plane facing an object to be photographed when photographing, and a release button configured to activate the photographing operation of the photographing optical system and provided on a side surface of the apparatus body corresponding with the photographing object side plane of the photographing optical system.

According to still another aspect of the present invention, a portable apparatus includes an apparatus body having a substantially flat shape, a photographing optical system configured to perform a photographing operation and accommodated in the apparatus body, the photographing optical system having a photographing optical axis in a direction perpendicular to a thickness direction of the apparatus body and a photographing object plane, the photographing object plane facing an object to be photographed when photographing, a release button configured to activate the photographing operation of the photographing optical system and provided on an upper surface of the apparatus body, the upper surface facing upward when the photographing optical axis of the photographing optical system is horizontal and the photographing object side plane of the photographing optical system is directed toward the object, and a grip protruding from a bottom surface of the apparatus body, the bottom surface facing downward when the photographing optical axis of the photographing optical system is horizontal and the photographing object side plane of the photographing optical system is directed toward the object.

According to still another aspect of the present invention, a portable apparatus includes an apparatus body having a substantially flat shape, a photographing optical system configured to perform a photographing operation and accommodated in the apparatus body, and a plurality of release buttons each configured to activate the photographing operation of the photographing optical system.

According to still another aspect of the present invention, a method of making a portable apparatus includes forming the apparatus body having a substantially flat shape, accommodating in the apparatus body a photographing optical system configured to perform a photographing operation such that a photographing optical axis thereof is arranged in a direction perpendicular to a thickness direction of the apparatus body, and arranging a release button configured to activate the photographing operation of the photographing optical system at a side surface of the apparatus body corresponding with a photographing object side plane of the photographing optical system, the photographing object side plane facing an object to be photographed when photographing.

According to still another aspect of the present invention, a method of making a portable apparatus includes forming an apparatus body having a substantially flat shape, accommodating in the apparatus body a photographing optical system configured to perform a photographing operation such that a photographing optical axis thereof is arranged in a direction perpendicular to a thickness direction of the apparatus body, arranging a release button configured to activate the photographing operation of the photographing optical system at an upper surface of the apparatus body, the upper surface facing upward when the photographing optical axis of the photographing optical system is horizontal and a photographing object side plane of the photographing optical system is directed toward the photographing object, the photographing object side plane facing an object to be photographed when photographing, and providing a grip so as to protrude from a bottom surface of the apparatus body, the bottom surface facing downward when the photographing optical axis is horizontal and the photographing object side plane is directed toward the object.

BRIEF DESCRIPTION OF THE DRAWINGS

A more complete appreciation of the present invention and many of the attendant advantages thereof will be readily obtained as the same becomes better understood by reference to the following detailed description when considered in conjunction with accompanying drawings, wherein.

DETAILED DESCRIPTION OF THE PREFERRED EMBODIMENTS

Figure 1:
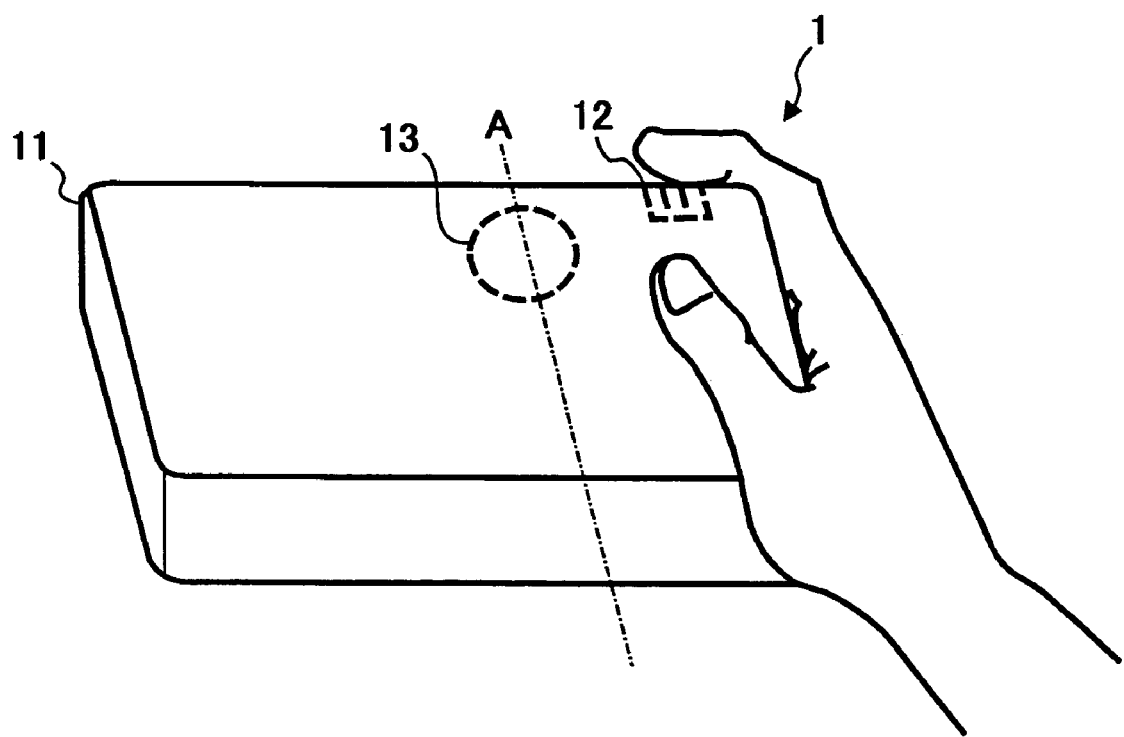
FIG. 1 is a perspective view of a camera according to one embodiment of the present invention in a photographing state.

Referring now to the drawings, wherein like reference numerals designate identical or corresponding parts throughout the several views, preferred embodiments of the present invention are described.

FIG. 1 illustrates a camera according to a preferred embodiment of the present invention in a photographing state. A camera 1 includes a camera body 11 and a release button 12. The camera body 11 has a flat rectangular parallelepiped shape and includes functional parts of the camera 1 including a photographing optical system 13. The photographing optical system 13 is arranged such that a photographing optical axis (A) thereof is parallel to a flat surface of the camera body 11. That is, the photographing optical axis (A) is perpendicular to the thickness direction of the camera body 11 and the longitudinal direction of the camera body 11. In photographing with the camera 1, the camera body 11 is held substantially horizontal, as the incident side of the photographing optical axis (A) of the photographing optical system is directed to a photographing object. The release button 12 is arranged on a side surface of the camera body 11 corresponding with the photographing object side plane of the photographing optical system. In FIG. 1, the release button 12 is arranged near the right side corner of the side surface of the camera body 11.

When the release button 12 is arranged as described above, the camera body 11 is held by pressing and sandwiching a side edge part of the flat camera body 11 from the upper and lower sides thereof, for example, with the thumb, the middle finger, the medical finger and the little finger, such that the release button 12 can be operated by the first finger in the direction substantially along the photographing optical axis (A). That is, the fingers holding the camera body 11 and the finger operating the release button 12 are separated from each other, such that the camera body 11 can be firmly held by the holding fingers and thereby the camera body 11 is prevented from being shaken when photographing, thus enabling stable and reliable photographing. Moreover, because the release button 12 is operated in the direction along the photographing axis (A), movement of the camera body 11 in a direction perpendicular to the photographing optical axis (A) is less likely to occur, so that a clear photograph can be easily obtained.

Figure 2:
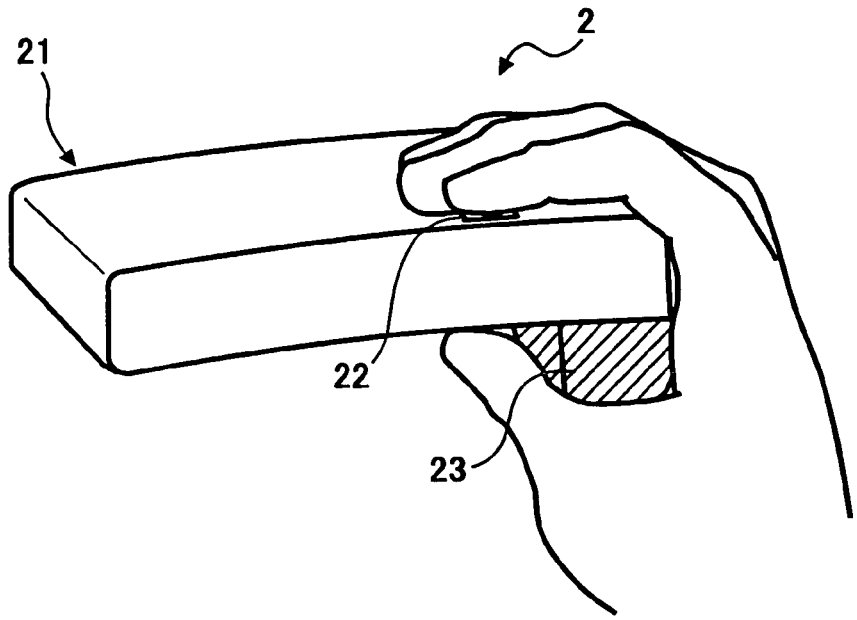
FIG. 2 is a perspective view of a camera according to another embodiment of the present invention in a photographing state.

FIG. 2 illustrates a camera according to another preferred embodiment of the present invention in a photographing state. A camera 2 includes a camera body 21, a release button 22 and a grip 22.

The camera body 21 has a flat rectangular parallelepiped shape as the camera body 11 illustrated in FIG. 1 and includes functional parts of the camera 2 such as a photographing optical system. The photographing optical system is arranged such that a photographing optical axis thereof is parallel to a flat surface of the camera body 21. That is, the photographing optical axis is perpendicular to the thickness direction of the camera body 21 and the longitudinal direction of the camera body 21. In photographing with the camera 2, the camera body 21 is held substantially horizontal, as the incident side of the photographing optical axis of the photographing optical system is directed to a photographing object. The release button 22 is arranged at a right side part of an upper surface of the camera body 21, near the side surface of the camera body 21 toward the right side of the photographer when the camera body 21 is held for photographing and the incident side of the photographing optical axis of the photographing optical system is directed to a photographing object. The grip 23 protrudes from the bottom surface of the camera body 21 downwardly along the right side surface of the camera body 21.

By thus arranging the grip 23, the camera body 21 is firmly held at a side edge part of the flat camera body 11 where the grip 23 protrudes downwardly with, for example, the thumb, the middle finger, the medical finger and the little finger, and the release button 22 is operated by the first finger. That is, the fingers securely holding the camera body 21 using the grip 23 and the finger operating the release button 22 are separated from each other, such that the camera body 21 is less likely to be shaken, thereby enabling stable photographing.

Because the grip 23 illustrated in FIG. 2 protrudes downwardly relative to the flat camera body 21, it is unwieldy when the camera 2 is carried.

Figure 3:
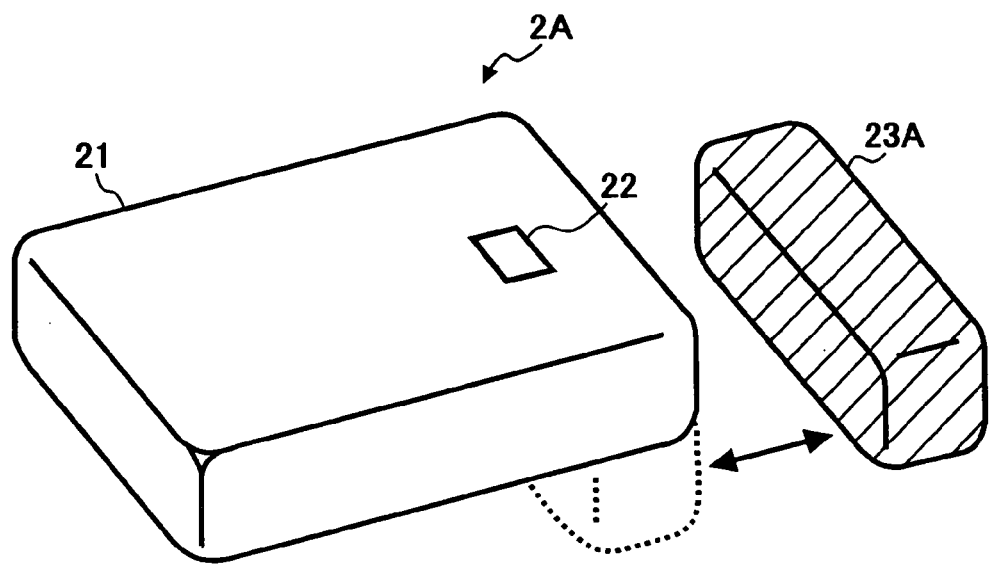
FIG. 3 is a perspective view of a camera according to yet another embodiment of the present invention.

FIG. 3 illustrates a camera according to another preferred embodiment of the present invention. A camera 2A includes a camera body 21, a release button 22 and a grip 23A. The grip 23A is detachable from a predetermined part of the bottom surface of the camera body 21 as illustrated in FIG. 3, when the camera 2A is carried. Because the grip 23A can be detached from the camera body 21, the portability of the camera 2A is not compromised. Further, in photographing, by attaching the grip 23A to the bottom surface of the camera body 21 as in the grip 23 of FIG. 2, the camera body 21 can be securely held with the hand as in the camera 2, thereby reducing the likelihood of shaking when photographing.

When the grip 23A of FIG. 3 is detached from the camera body 21, the detached grip 23A may be lost.

Figure 4:
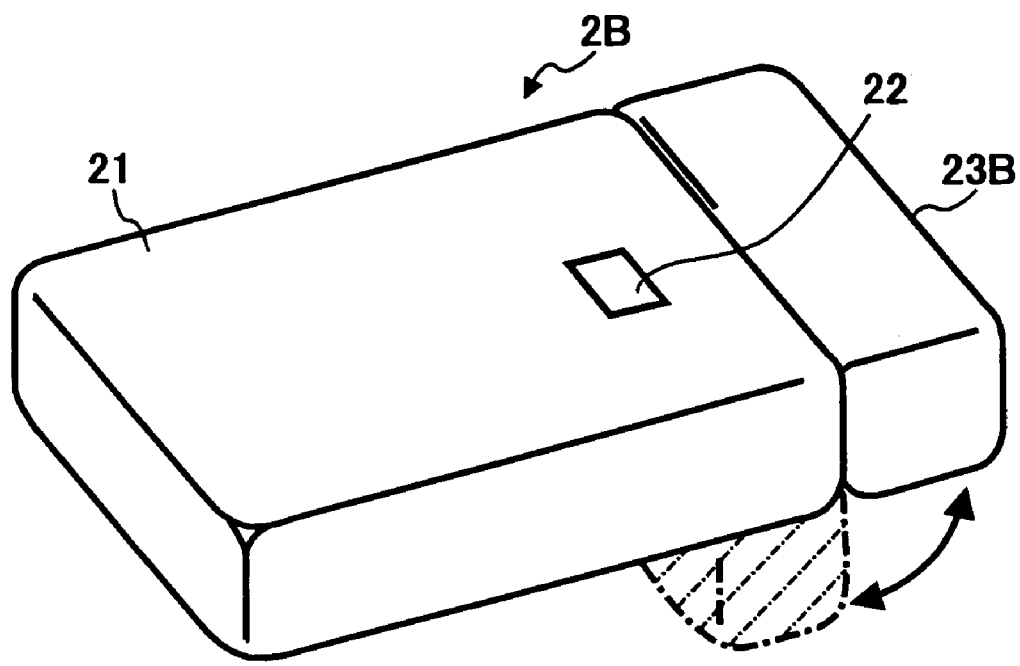
FIG. 4 is a perspective view of a camera according to still another embodiment of the present invention.

FIG. 4 illustrates a camera according to another preferred embodiment of the present invention, which solves such a problem. A camera 2B includes a camera body 21, and a release button and a grip 23B.

The grip 23B is rotatable around an axis line along a side edge of the camera body 21. When the camera 2B is carried, the grip 23b is positioned so as to extend beside the camera body 21, and when photographing, the grip 23B is rotated 90 degree so as to protrude downwardly relatively to the camera body 21, as respectively illustrated in FIG. 4. Thus, when the camera 2 is being carried, because the grip 23B is flat with the camera body 21, the portability is superior, and when photographing, the grip 21B is rotated to protrude downwardly relative to the camera body 21 like the grip 23 of FIG. 2, allowing the camera body 21 to be securely held in hand and thereby reducing the likelihood of shaking.

Further, by providing the above-described release button 12 of FIG. 1 as a sub-release button along with the release button 22 of FIGS. 2-4, a camera becomes more adaptable to the photographing condition while reducing the likelihood of shaking.

Figure 5:
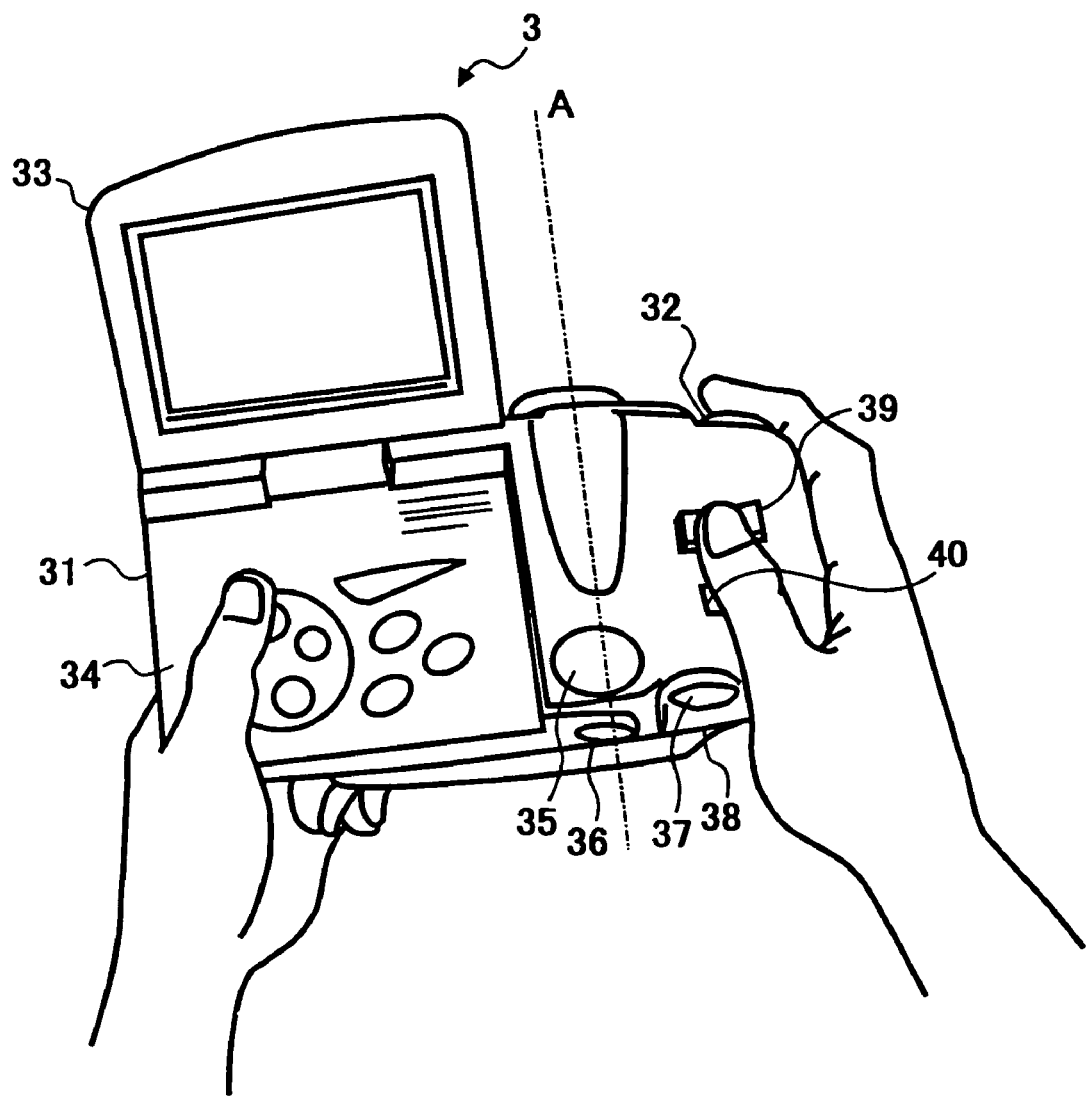
FIG. 5 is a perspective view of a camera according to still another embodiment of the present invention.
Figure 6:
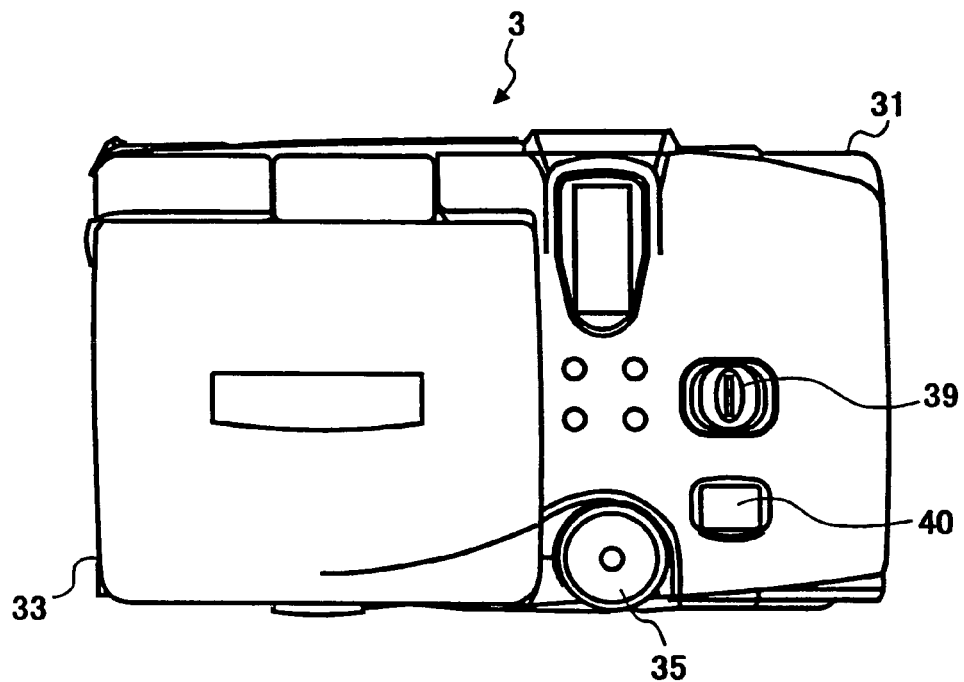
FIG. 6 is a plan view of the camera in FIG. 5.
Figure 7:
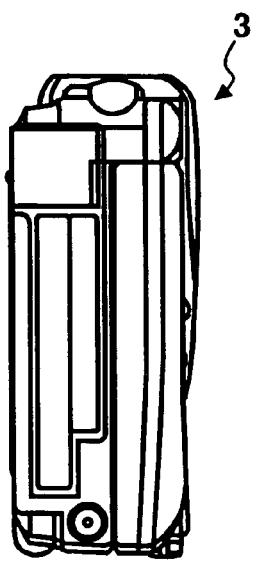
FIG. 7 is a left side view of the camera in FIG. 5.
Figure 8:
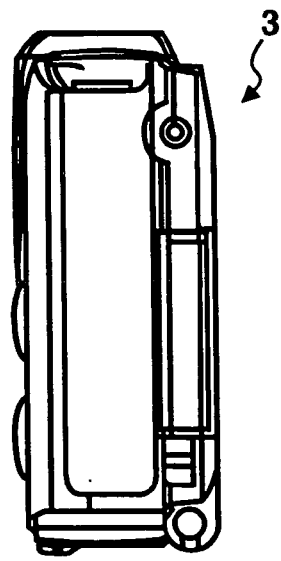
FIG. 8 is a right side view of the camera in FIG. 5.
Figure 12:
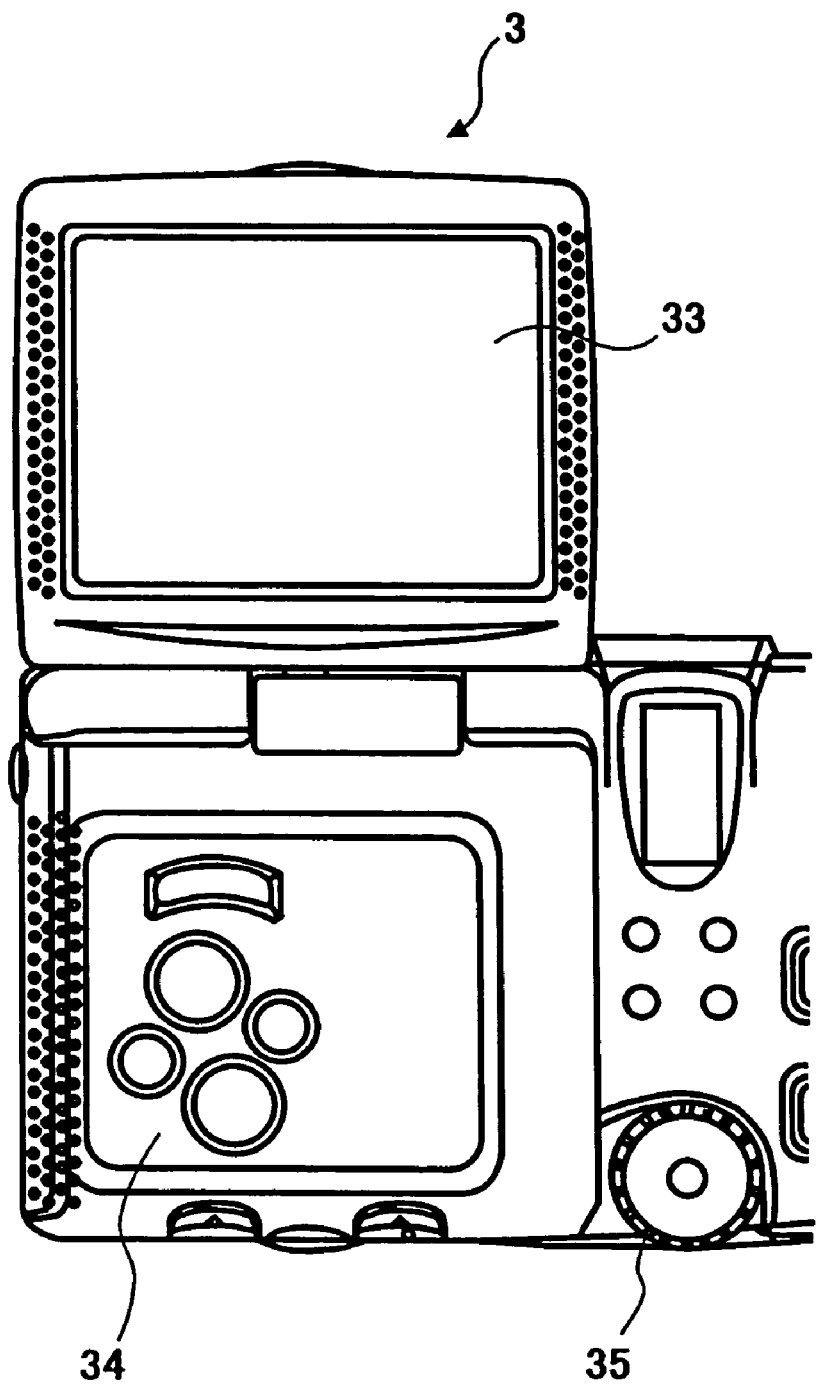
FIG. 12 is a plan view of an upper surface of the camera in FIG. 5, with a display part of the camera opened.

FIGS. 5-13 illustrate a camera 3 according to another preferred embodiment of the present invention in a photographing state. FIG. 5 is a view from the top of the camera 3 in the photographing state with a display part opened. FIGS. 6, 7, 8, 9, 10 and 11 are a plan view of an upper surface, a left side view, a right side view, a front side view, a back side view and a bottom view of the camera 3, respectively, with the display part closed, and FIG. 12 is a partial view of the upper surface of the camera 3 with the display part opened.

Figure 9:
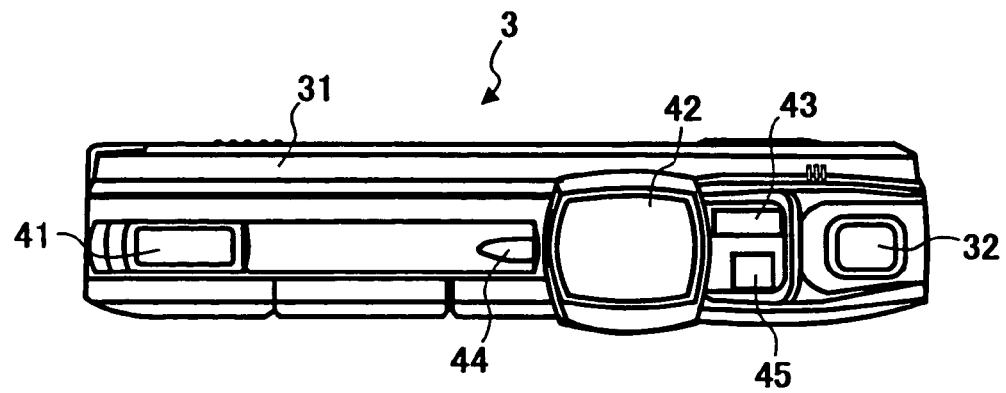
FIG. 9 is a front side view of the camera in FIG. 5.
Figure 10:
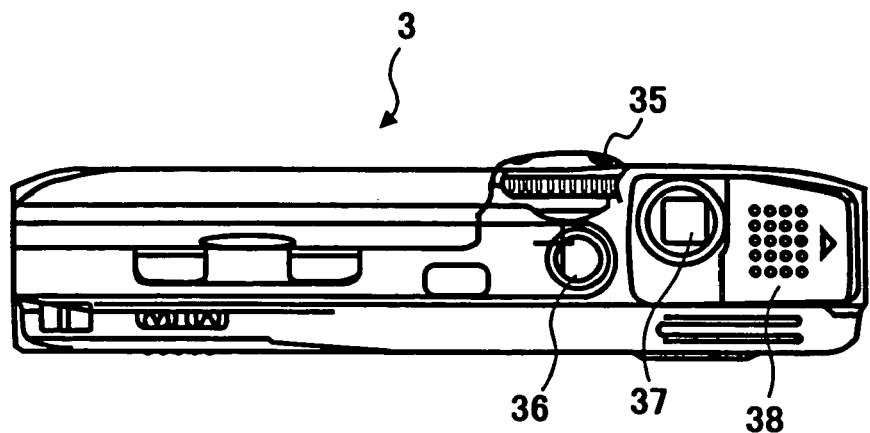
FIG. 10 is a back side view of the camera in FIG. 5.
Figure 11:
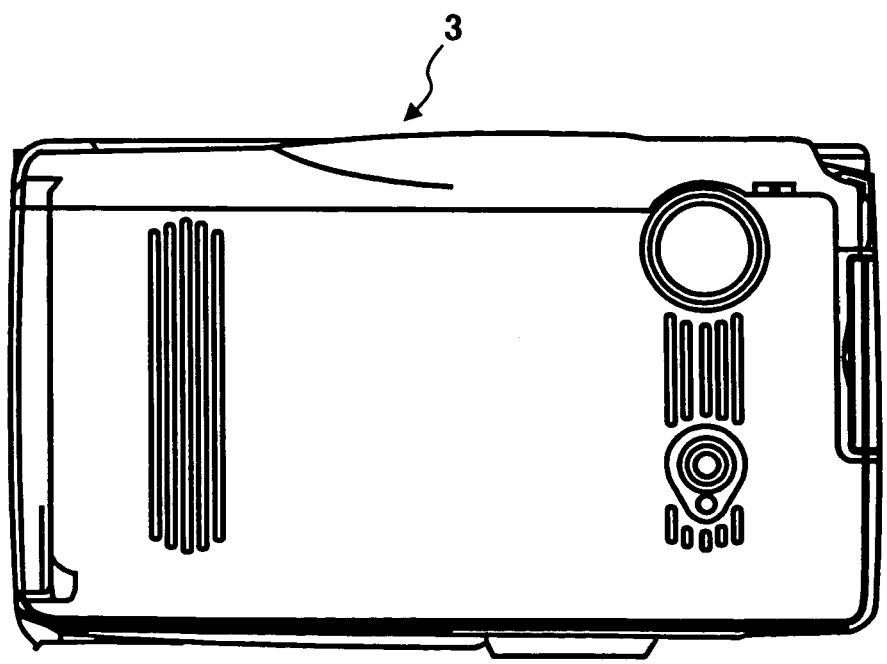
FIG. 11 is a bottom view of the camera in FIG. 5.

As illustrated in FIGS. 5 and 9, the camera 3 includes a camera body 31, a sub-release button 32, a liquid crystal display (LCD) part 33, a screen operation part 34, a mode dial 35, a main power switch 36, a finder eye-contact part 37, a battery cover 38, a zoom lever 39, a main release button 40, a strobe light emitting part 41, a photographing optical system object plane 42, a distance measuring window 43, a self-timer light emitting part/remote controller light receiving part 44, and a finder window 45.

The camera 3 is an electronic or digital camera capable of converting a photographed image into image data with a solid-state photographing element and recording the image data in an electronic recording medium. The camera body 31 has a flat rectangular parallelepiped shape like the camera body 11 of FIG. 1 and accommodates functional parts of the camera 3 such as a photographing optical system including the solid-state photographing element, e.g., a CCD element, a recording medium, e.g., a flash memory, for recording data of an image photographed by the photographing optical system, for example. The photographing optical system is arranged such that a photographing optical axis (A) is parallel to a flat surface of the camera body 31. That is, the photographing optical axis (A) is perpendicular to the thickness direction of the camera body 31 and the longitudinal direction of the camera body 31. In photographing with the camera 3, the camera body 31 is held substantially horizontal, as the incident side of the photographing optical axis (A) of the photographing optical system is directed to a photographing object. The sub-release button 32 is arranged on a side surface of the camera body 31 corresponding with the side of the object plane of the photographing optical system. That is, the sub-release button 32 is positioned on the object side of the camera body 31 near a right side corner thereof.

The liquid crystal display part 33 opens and closes relative to the camera body 31 and displays a photographing view range as an electronic finder or a photographed image after photographing to view or check the photographed image. The liquid display part 33 may be also used for displaying other operating conditions of the camera 3, or another liquid display part may be provided separately from the liquid display part 33 exclusively for displaying the other operating conditions of the camera 3. Further, instead of the liquid crystal display part 33, the camera 3 may include a display part using an LED (light emitting diode), a plasma display or an EL (electro-luminescence). When the liquid display part 33 is opened, as illustrated in FIGS. 5 and 12, a display screen of the liquid display part 33 is exposed to be viewed from the outside. When the liquid display part 33 is closed, the display screen closely contacts the camera body 32 to be completely covered as illustrated in FIGS. 6-11 such that, for example, when the camera 3 is being carried, the display screen is protected against shock from the outside and prevented from being scratched or soiled. When the liquid crystal display part 33 is closed, the power to the display part 33 is turned off, so that useless power consumption is avoided. The screen operating part 34 includes a plurality of buttons for various operations in reproducing and displaying recorded images on the liquid crystal display part 33.

The mode dial 35 is used for selecting photographing modes corresponding to various photographing conditions. The main switch 36 is used for turning on and off the power source, for example, a battery. By turning on the main switch 36, the camera 3 is ready for photographing, and reproducing and displaying photographed images. The finder eye-contact part 37 is an eye-contact part of an optical finder system accommodated in the camera body 31. In photographing, the photographer confirms a photographing field view by looking in at the finder eye-contact part 37. The battery cover 38 covers and opens a battery accommodation room of the camera body 31. The zoom lever 39 is an operation part for operating a zooming operation of the photographing optical system and preferably that of the finder optical system cooperating with the photographing optical system. The main release button 40 is a release button used in photographing, for example, using a tripod, an object capable of being photographed without blurring, or in a posture not likely to shake the camera 3.

The strobe light emitting part 41 emits a light to illuminate a photographing object. The photographing optical system object plane 42 is an object plane of the photographing optical system accommodated in the camera body 31. The distance measuring window 43 is a light emitting/receiving window for measuring the distance for an AF (automatic focus) control operation. The self-timer light emitting/receiving window 44 indicates the operating conditions of a self-timer by being turned on and off when the self-timer is operated, and receives, for example, infrared rays from a remote controller when the remote controller is operated. The finder window 45 is provided at the object side of the finder optical system accommodated in the camera body 31.

The camera 3 may further include a communication device, though not illustrated, to transmit data of an image photographed by the photographing optical system, for example, via a cable to a terminal or by wireless transmission to a remote terminal.

Figure 13:
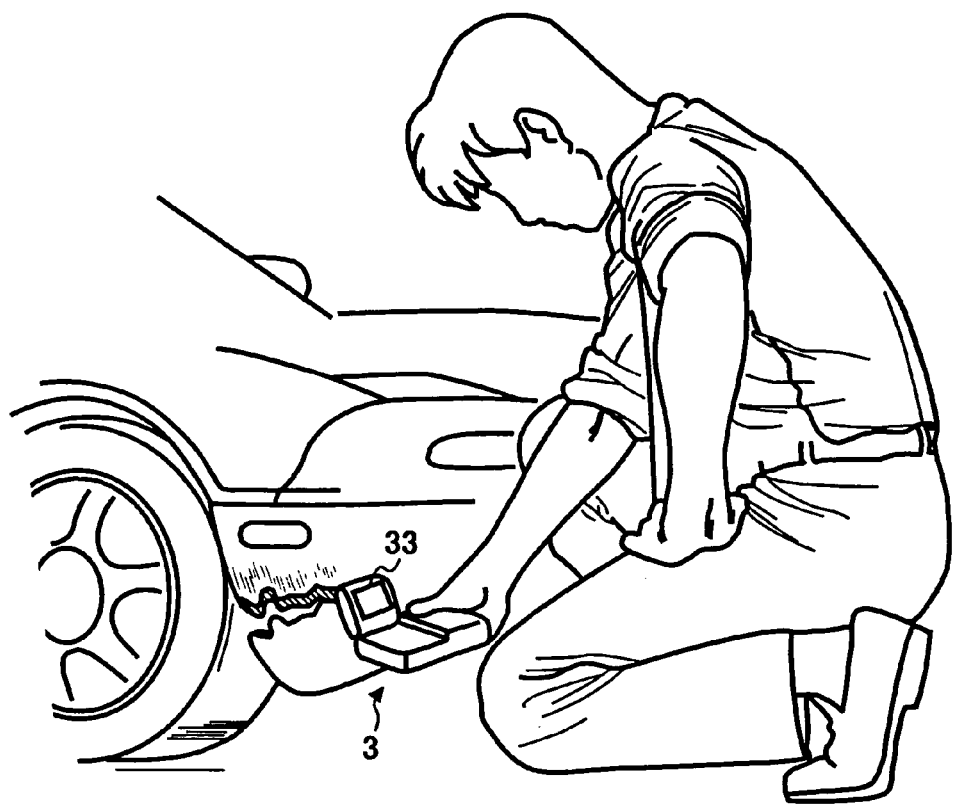
FIG. 13 is a perspective view of a state of photographing at a low angle with the camera in FIG. 5.
Figure 14:
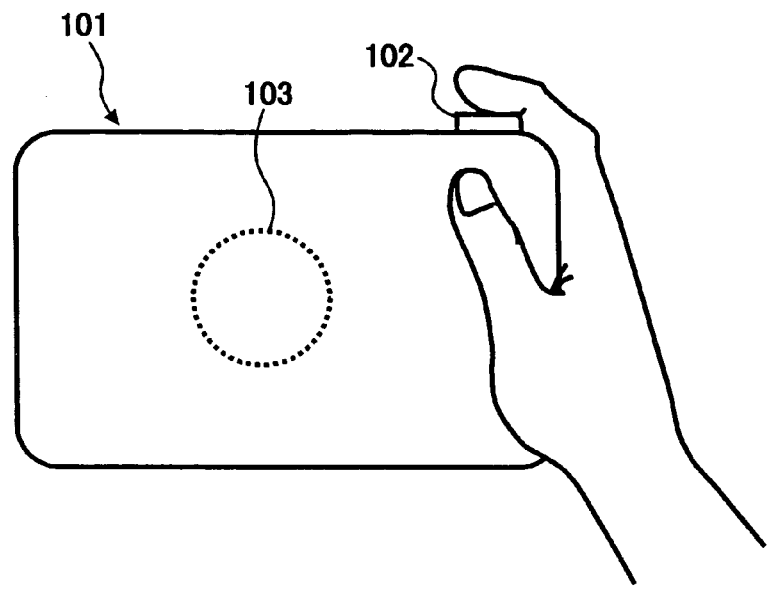
FIG. 14 is a perspective view of a background camera in a photographing state.
Figure 15:
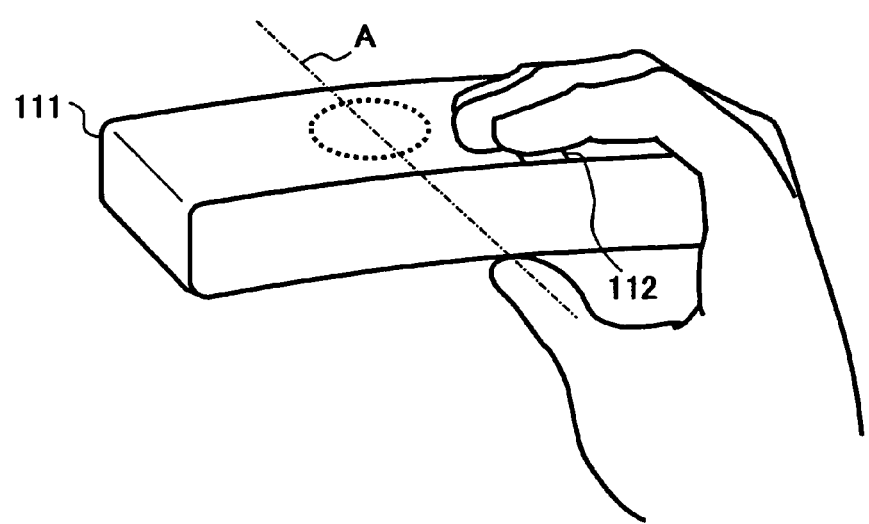
FIG. 15 is a perspective view of another background camera in a photographing state.

As in the camera 1 of FIG. 1, in photographing with the camera 3 of this embodiment using the sub-release button 32, as illustrated in FIG. 5, the camera body 31 is held by pressing a side edge part of the flat camera body 31 from the upper and lower sides thereof, for example, with the thumb, the middle finger, the medical finger and the little finger, and the sub-release button 32 is operated by the first finger in the direction along the photographing optical axis (A). Thus, the fingers holding the camera body 31 and the finger operating the sub-release button 32 are separated from each other such that shaking of the camera 3 in photographing hardly occurs, thereby enabling stable photographing. Further, because the operation direction of the release button 32 accords with the direction of the photographing optical axis (A), shaking of the camera 31 in photographing is less likely to occur, so that a clear photograph is obtained more easily. Moreover, as illustrated in FIG. 13, when using the liquid crystal display part 33 as an electronic finder, the operability is superior even in photographing at a low angle condition close to the ground. Thus shaking of camera 3 hardly occurs even in such a low angle photographing.

In the above-described embodiments, the description has been made for electronic or digital cameras. However, the present invention can be practiced in a similar manner in silver-salt film cameras.

Further, the present invention can be applied to portable apparatuses such as portable image inputting apparatuses, portable information terminal apparatuses and portable telephone terminal apparatuses that have a photographing optical system for photographing. The portable apparatuses may, in substantially the same manner as in the camera 3 above, convert an image photographed by the photographing optical system into image data with a solid-state photographing element thereof and record the image data in an electronic recording medium and/or input into a computer device such as a personal computer locally via a cable or transmit over a network to a remote computer or terminal.

Therefore, according to another preferred embodiment of the present invention, a portable apparatus includes an apparatus body formed in a substantially flat shape. The portable apparatus includes a photographing optical system configured to perform an operation of photographing a photographing object and accommodated in the apparatus body. The photographing optical system has a photographing optical axis in a direction perpendicular to a thickness direction of the apparatus body, and a photographing object side plane. A release button configured to activate the photographing operation of the photographing optical system when manipulated is arranged at a side surface of the apparatus body corresponding to the photographing object side plane of the photographing optical system.

According to yet another preferred embodiment of the present invention, a portable apparatus includes an apparatus body formed in a substantially flat shape. The portable apparatus includes a photographing optical system configured to perform an operation of photographing a photographing object and accommodated in the apparatus body. The photographing optical system has a photographing optical axis in a direction perpendicular to a thickness direction of the apparatus body, and a photographing object plane. A release button configured to activate the photographing operation of the photographing optical system when manipulated is arranged at an upper surface of the apparatus body when the photographing optical axis of the photographing optical system is horizontal and the photographing object side plane of the photographing optical system is directed toward the photographing object. A grip protrudes from a bottom surface of the apparatus body when the photographing optical axis of the photographing optical system is horizontal and the photographing object side plane of the photographing optical system is directed toward the photographing object. The grip may be detachable from the camera body, or rotatably provided to a side edge of the apparatus body, so as to be positioned by the side of the apparatus body or to protrude downwardly relative to the apparatus body.

According to still another preferred embodiment of the present invention, a portable apparatus includes an apparatus body formed in a substantially flat shape. A photographing optical system configured to perform an operation of photographing a photographing object is accommodated in the apparatus body, and a plurality of release buttons respectively configured to activate the photographing operation of the photographing optical system when manipulated are provided to the apparatus body. The photographing optical system may have a photographing optical axis in a direction perpendicular to a thickness direction of the apparatus body, and a photographing object side plane. The plurality of release buttons may include a first and second release buttons, and the first release button may be arranged at a side surface of the camera body corresponding to the photographing object side plane of the photographing optical system, and the second release button at an upper surface of the apparatus body when the photographing optical axis of the photographing optical system is horizontal and the photographing object side plane of the photographing optical system is directed toward the photographing object.

In the above-described portable apparatuses, the photographing optical system may include a solid-state photographing element configured to convert an image of the photographed object into image data. The portable apparatuses may further include a recording device configured to record the image data in a recording medium and a display device to display the image data. The apparatuses may further include a communication device configured to transmit the image data. The data may be transmitted to a terminal via a cable or to a remote terminal by wireless transmission.

Numerous additional modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the United States is:

1. A camera, comprising:
   a photographing optical system configured to perform a photographing operation and accommodated in a camera body of the camera, the photographing optical system having a photographing optical axis perpendicular to a thickness dimension of the camera body and the photographing optical axis extending from a photographing object side plane;
   a release button configured to actuate the photographing operation of the photographing optical system, said release button being provided on a side surface of the camera body in the photographing object side plane and configured to receive an actuation force substantially parallel with respect to the photographing optical axis; and
   an electronic display part which is at least a portion of a top surface of the camera body, the top surface being in a plane which is parallel to the photographing optical axis, and said electronic display part including an electronic display and being openable with respect to the camera body.

2. The camera of claim 1, wherein the release button is provided on a right side part of the side surface of the camera body.

3. The camera of claim 1, wherein the photographing optical system includes a solid-state photographing element configured to convert an image of an object photographed into image data.

4. The camera of claim 3, further comprising:
   a recording device configured to record the image data in a recording medium.

5. The camera of claim 3, wherein the electronic display part is further configured to display at least one of the image and the image data.

6. The camera of claim 3, further comprising:
   a communication device configured to transmit the image data.

7. The camera of claim 6, wherein the communication device includes a wireless transmission device configured to transmit the image data to a remote terminal by wireless transmission.

8. The camera of claim 6, wherein the communication device includes an interface device configured to transmit the image data to a terminal via a cable.

9. The camera of claim 1, further comprising:
   a wireless telephone device.

10. The camera of claim 1, further including an operation section configured to input various information, wherein said electronic display part covers the operation section when the electronic display part is in a storage position.

11. The camera of claim 10, wherein said electronic display part reveals the electronic display when extended from the storage position, said electronic display displaying an imaging area.

12. A camera, comprising:
   a photographing optical system configured to perform a photographing operation and accommodated in a camera body of the camera, the photographing optical system having a photographing optical axis;
   a plurality of release buttons each configured to actuate the photographing operation of the photographing optical system;
   at least one of the release buttons being configured to receive an actuation force substantially parallel with respect to the photographing optical axis; and an electronic display part which is at least a portion of a top surface of the camera body, the top surface being in a plane which is parallel to the photographing optical axis, and said electronic display part including an electronic display and being openable with respect to the camera body.

13. The camera of claim 12, wherein:

the photographing optical axis is perpendicular to a thickness dimension of the camera body and a photographing object side plane;

the plurality of release buttons comprise first and second release buttons;

the first release button of the plurality of release buttons is provided on a side surface of the camera body in the photographing object side plane of the photographing optical system; and the second release button of the plurality of release buttons is provided on top surface of the camera body, the top surface facing upward when the photographing optical axis of the photographing optical system is horizontal and the photographing object side plane of the photographing optical system is directed toward an object to be photographed.

14. The camera of claim 12, wherein the photographing optical system includes a solid-state photographing element configured to convert an image of an object photographed into image data.

15. The camera of claim 14, further comprising:

a recording device configured to record the image data in a recording medium.

16. The camera of claim 14, wherein the electronic display part is further configured to display at least one of the image and the image data.

17. The camera of claim 14, further comprising: a communication device configured to transmit the image data.

18. The camera of claim 17, wherein the communication device includes a wireless transmission device configured to transmit the image data to a remote terminal by wireless transmission.

19. The camera of claim 17, wherein the communication device includes an interface device configured to transmit the image data to a terminal via a cable.

20. The camera of claim 12, further comprising:

a wireless telephone device.

21. The camera of claim 12, further including an operation section configured to input various information, wherein said electronic display part covers the operation section when the electronic display part is in a storage position.

22. The camera of claim 21, wherein said electronic display part reveals the electronic display when extended from the storage position, said electronic display displaying an imaging area.

23. A camera, comprising:

photographing means for performing a photographing operation, the photographing means being accommodated in a camera body and having a photographing optical axis perpendicular to a thickness dimension of the camera body and a photographing object side plane, the photographing object side plane facing an object to be photographed when performing the photographing operation;

actuation means for actuating the photographing operation of the photographing means, the actuation means being provided on a side surface of the camera body in the photographing object side plane of the photographing means; and the actuation means receives an actuation force substantially parallel with respect to the photographing optical axis; and an electronic display part which is at least a portion of a top surface of the camera body, the top surface being in a plane which is parallel to the photographing optical axis, and said electronic display part including an electronic display and being openable with respect to the camera body.

24. The camera of claim 23, further including an operation section configured to input various information, wherein said electronic display part covers the operation section when the electronic display part is in a storage position.

25. A method of making a camera, comprising:

accommodating in a camera body of the camera a photographing optical system configured to perform a photographing operation such that a photographing optical axis thereof is perpendicular to a thickness dimension of the camera body;

arranging a release button configured to actuate the photographing operation of the photographing optical system at a side surface of the camera body in a photographing object side plane of the photographing optical system, the photographing object side plane facing an object to be photographed when photographing and arranging the release button so the release button receives an actuation force substantially parallel to the photographing optical axis; and positioning an electronic display part on the camera body so as to form at least a portion of a top surface of the camera body, the top surface being in a plane which is parallel to the photographing optical axis, and said electronic display part including an electronic display and being openable with respect to the camera body.

26. The method of claim 25, wherein arranging includes arranging at least one release button at a right side part of the side surface of the camera body.

27. The method of claim 25, wherein the positioning further includes arranging an operation section on the camera body, the operation section configured to input various information, wherein said electronic display part covers the operation section when the electronic display part is in a storage position.

28. The method of claim 27, wherein said electronic display part reveals the electronic display when extended from the storage position, said electronic display displaying an imaging area.

29. A portable apparatus, comprising:

a photographing optical system configured to perform a photographing operation and accommodated in an apparatus body of the portable apparatus, the photographing optical system having a photographing optical axis perpendicular to a thickness dimension of the apparatus body and a photographing object side plane, the photographing object side plane facing an object to be photographed when performing the photographing operation;

a release button configured to actuate the photographing operation of the photographing optical system and provided on a side surface of the apparatus body in the photographing object side plane of the photographing optical system and configured to receive an actuation force substantially parallel with respect to photographing optical axis; and an electronic display part which is a portion of a top surface of the camera body, the top surface being in a plane which is parallel to the photographing optical axis, and said electronic display part including an electronic display and being openable with respect to the camera body.

30. The portable apparatus of claim 29, wherein the release button is provided on a right side part of the side surface of the apparatus body.

31. The portable apparatus of claim 29, wherein the photographing optical system includes a solid-state photographing element configured to convert an image of an object photographed into image data.

32. The portable apparatus of claim 31, further comprising:
a recording device configured to record the image data in a recording medium.

33. The portable apparatus of claim 31, wherein the electronic display part is further configured to display at least one of the image and the image data.

34. The portable apparatus of claim 31, further comprising:
a communication device configured to transmit the image data.

35. The portable apparatus of claim 34, wherein the communication device includes a wireless transmission device configured to transmit the image data to a remote terminal by wireless transmission.

36. The portable apparatus of claim 34, wherein the communication device includes an interface device configured to transmit the image data to a terminal via a cable.

37. The portable apparatus of claim 29, further comprising:
a wireless telephone device.

38. The portable apparatus of claim 29, further including an operation section configured to input various information, wherein said electronic display part covers the operation section when the electronic display part is in a storage position.

39. The portable apparatus of claim 38, wherein said electronic display part reveals the electronic display when extended from the storage position, said electronic display displaying an imaging area.

40. A portable apparatus comprising:
photographing means for performing a photographing operation, the photographing means being accommodated in an apparatus body of the apparatus and having a photographing optical axis perpendicular to a thickness dimension of the apparatus body and a photographing object side plane, the photographing object side plane facing an object to be photographed when photographing;
actuation means for actuating the photographing operation of the photographing means, the actuation means being provided on a side surface of the apparatus body in the photographing object side plane of the photographing means and receiving an actuation force substantially parallel to the photographing optical axis; and
an electronic display part which is a portion of a top surface of the camera body, the top surface being in a plane which is parallel to the photographing optical axis, and said electronic display part including an electronic display and being openable with respect to the camera body.

41. The portable apparatus of claim 40, further including an operation section configured to input various information, wherein said electronic display part covers the operation section when the electronic display part is in a storage position.

42. The camera as claimed in claim 41, wherein said electronic display part reveals the electronic display when extended from the storage position, said electronic display displaying an imaging area.

43. A method of making a portable apparatus, comprising:
accommodating in the-an apparatus body of the apparatus a photographing optical system configured to perform a photographing operation such that a photographing optical axis thereof is arranged perpendicular to a thickness dimension of the apparatus body;
arranging a release button configured to actuate the photographing operation of the photographing optical system at a side surface of the apparatus body in a photographing object side plane of the photographing optical system, the photographing object side plane facing an object to be photographed when photographing, and arranging the release button so the release button receives an actuation force substantially parallel to the photographing optical axis; and
positioning an electronic display part on the camera body so as to form at least a portion of a top surface of the camera body, the top surface being in a plane which is parallel to the photographing optical axis, and said electronic display part including an electronic display and being openable with respect to the camera body.

44. The method of claim 43, wherein arranging includes arranging the release button at a right side part of the side surface of the apparatus body.

45. The method of claim 43, wherein the positioning further includes arranging an operation section on the camera body, the operation section configured to input various information, wherein said electronic display part covers the operation section when the electronic display part is in a storage position.

46. The method of claim 45, wherein said electronic display part reveals the electronic display when extended from the storage position, said electronic display displaying an imaging area.

47. The camera of claim 24, wherein said electronic display part reveals the electronic display when extended from the storage position, said electronic display displaying an imaging area.

* * * * *